Figure 1:
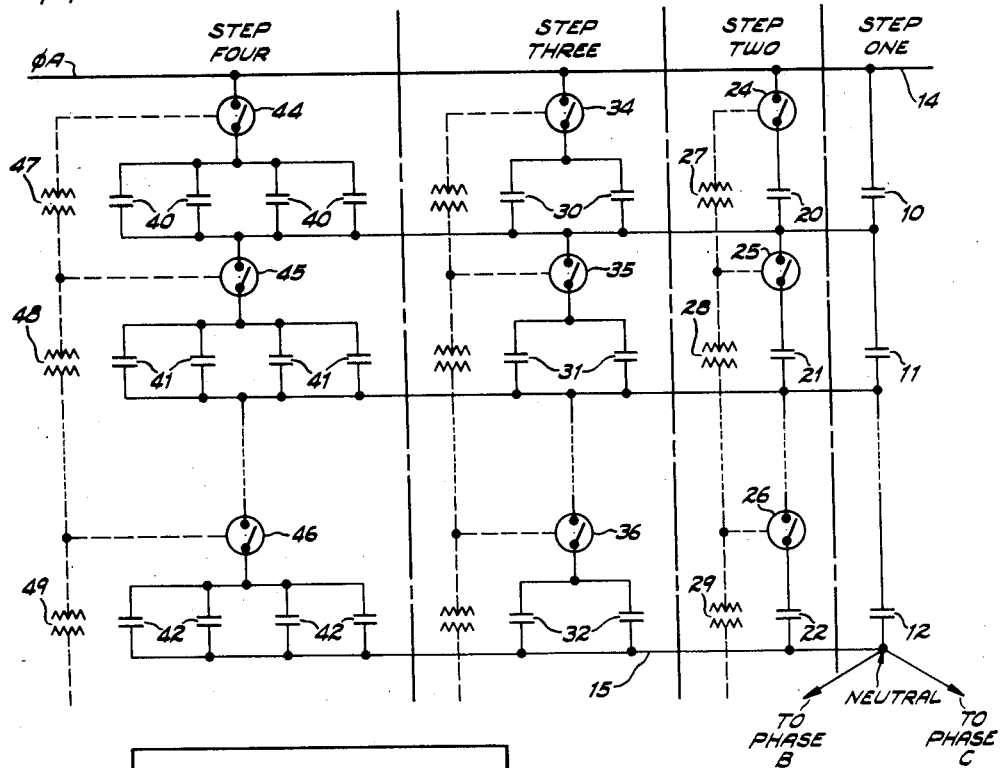

Sept. 6, 1960      P. M. MINDER      2,951,981

CAPACITOR BANK

Filed Aug. 10, 1956

INVENTOR.

Peter M. Minder

BY Lee H. Kaiser

Attorney

United States Patent Office 2,951,981
Patented Sept. 6, 1960

2,951,981
CAPACITOR BANK

Peter M. Minder, Basel, Switzerland, assignor to Mc-Graw-Edison Company, a corporation of Delaware Filed Aug. 10, 1956, Ser. No. 603,343

7 Claims. (Cl. 323—122)

This invention relates to shunt capacitor banks for alternating current electrical power systems and in particular to means for connecting the capacitors of such a bank in shunt to a power system.

Capacitors are frequently connected in shunt to alternating current transmission and distribution lines to relieve the system of the need for carrying a part of the reactive requirements of the load. Changes in operating conditions on the system usually require variation in the amount of leading reactive volt amperes supplied to the line, and conventionally the total capacitive reactance of the bank is divided into a plurality of steps each of which is provided with its own circuit breaker. The circuit breaker switches at full phase to phase, or phase to neutral voltage and, in addition, must be capable of handling short circuit currents. Restriking phenomena and the attendant voltage surges are encouraged when switching capacitive currents involved in de-entrgizing capacitor banks, and when a large capacitor bank is de-energized, larger than normal system voltages may exist across the circuit breaker contacts because of the trapped charge on the capacitors and thus impose a greater than normal stress on the circuit breaker dielectric. In order to interrupt the current to the capacitors with a minimum of restriking, such circuit breakers are preferably of the oil-filled type. Oil-filled circuit breakers insulated for full line voltage are very expensive, and when a separate oil circuit breaker must be provided for each step of the bank, the cost becomes prohibitive for some installations.

A capacitor bank is disclosed in application Serial No. 402,296, filed January 5, 1954, now Patent No. 2,887,647, in the name of Henry H. Strozier entitled "Voltage Divider for Switching Capacitors" and having the same assignee as the present invention, wherein only one expensive oil circuit breaker is required to switch the capacitor bank. The first step of the bank is switched at full line voltage in a conventional manner by an oil-filled circuit breaker, and the capacitors of the first step are used as a voltage divider which permits switching of capacitors of succeeding steps by relatively inexpensive switches in parallel with capacitors of the first step at voltages which are only a fraction of the line voltage.

It is an object of the invention to provide an arrangement for varying the reactive kilovars supplied by a capacitor bank to an alternating current power system in a series of steps which obviates the necessity of an expensive oil circuit breaker.

When the voltage divider principle of capacitor switching disclosed in the aforementioned application, Serial No. 402,296, is utilized, the capacitors of each step, after the first, are connected in parallel with capacitors which are already energized. The relatively low voltage switches which accomplish the paralleling of the capacitors of each step with the capacitors of the previously energized steps may not operate exactly simultaneously, and the voltage across the capacitors of the previously energized steps which have not been paralleled will increase each time one of the low voltage switches closes. The overvoltage will be a maximum when $n-1$ low voltage switches in any step have been closed, where $n$ is the number of capacitors in series between line and neutral. Thus the overvoltage will be a maximum across the last of the previously energized capacitors, or series groups, to be shunted by capacitors of the step being connected to the system. This will be apparent when it is considered that the voltage across any one of a group of serially arranged capacitors is inversely proportional to its capacitance, and when a capacitor of a succeeding step is connected in shunt with a previously switched capacitor, the total capacitance of the two capacitors in shunt is increased (the resultant impedance of the two capacitors in parallel is less than that of a single capacitor), and the voltage on the remaining serially connected capacitors is increased. Thus the overvoltage is greatest on that already energized capacitor, or series group, which is the last to be connected in parallel with a capacitor of the step being switched. The magnitude of this overvoltage increases with the number of capacitors in series between phase conductor and neutral and also with the kilovars of the step being switched onto the power system, and such overvoltage may be of sufficient magnitude to damage the capacitors or other equipment.

It is a further object of the invention to provide a capacitor bank switched in accordance with the voltage divider principle wherein the kilovars of the different steps are so proportioned that the overvoltage on the capacitors, or series groups, is never of sufficient magnitude and duration during the switching of the steps to seriously damage the capacitors.

Figure 2:
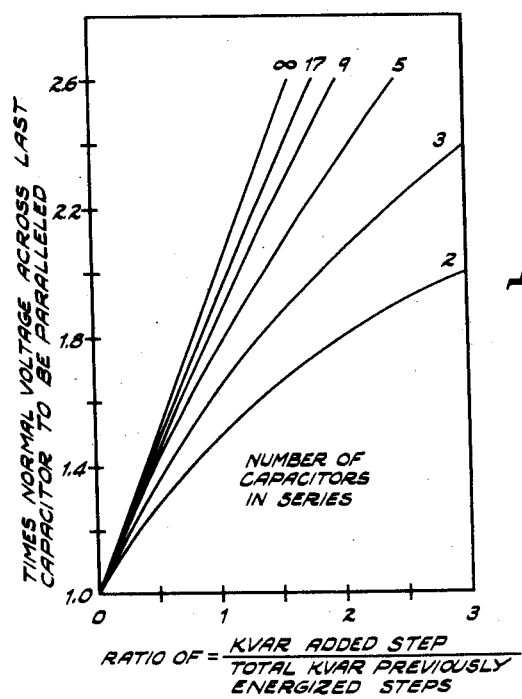

Other objects and advantages of the invention will be apparent from the following description when taken in conjunction with the accompanying drawing wherein:

Fig. 1 is a schematic circuit diagram illustrating a single phase of a capacitor bank in accordance with the invention; and Fig. 2 is a curve illustrating the overvoltage which may occur on capacitors switched in accordance with the voltage divider principle when plotted as a function of the ratio of size of the added step of capacitors to that of the previously energized steps.

The invention is only applicable to multi-series capacitor banks wherein a plurality of serially arranged capacitors, or groups of paralleled capacitors, are connected in shunt to an alternating current power system. Only a single phase of a capacitor bank arranged to supply reactive volt amperes to an alternating current power line in a plurality of steps (four steps being shown) is illustrated in Fig. 1 wherein a plurality of capacitors 10, 11, 12, etc. of the first step are connected in series, and this serial arrangement is permanently connected in shunt between conductors 14 and 15 which may be a phase conductor and neutral of a polyphase power system or the lines of a single phase system. The number of capacitors 10, 11, 12, etc. in series is determined by the line voltage and the rating of the capacitors. Only three capacitors 10, 11 and 12 are shown in Fig. 1, it being represented by dotted lines in the electrical leads (e.g., between capacitors 11 and 12, capacitor 21 and switch 26, etc.) that any number of capacitors may be connected in series between conductors 14 and 15. Assuming that Fig. 1 illustrates phase A of a three phase capacitor bank and that the conductors 14 and 15 represent phase conductor $\phi_A$ and the neutral of a three phase power system, it will be appreciated that the other phases, B and C, which have been omitted to clarify the drawing and to facilitate the understanding of the invention, will be similar to phase A. It will also be appreciated that each symbol 10, 11, 12, etc. may represent either a single capacitor unit or a plurality of capacitor units connected in parallel, i.e., a "series group" of paralleled capacitors.

In order to keep the "unswitched" reactive volt amperes (i.e., continuously energized capacitors) of the first step to a minimum, preferably each capacitor 10, 11, 12, etc. is a single unit and preferably these units are not fused. If fusing of the capacitors is desired, it is preferable that each capacitor symbol 10, 11, 12, etc. represent at least two capacitor units in parallel to prevent the fuses from interrupting line to neutral voltage. If it is desirable to keep the overvoltage on the capacitors of the first step from exceeding 110 percent of rated voltage after removal of one of the capacitors upon operation of a fuse, it is preferable that fifteen kilovar capacitors be utilized to keep the total kilovars of the first step to a low value. In this event the number of capacitors in each series group 10, 11, 12, etc. will preferably vary from 8 to 11 depending on the line voltage. The small kilovar size of the first step insures that the first step presents a relatively high impedance. In a typical installation the number of kilovars of the first step will vary between two percent and twelve percent of the total kilovars of the bank.

Switches 24, 25, 26, etc. insulated for less than full line voltage, or less than line to neutral voltage, are connected to switch the capacitors 20, 21, 22, etc. of the second step in parallel with capacitors 10, 11, 12, etc. respectively of the first step at voltages which are only $1/n$ of the line voltage, where $n$ is the number of capacitors, or series groups, 10, 11, 12, etc. in series between conductors 14 and 15. For example, capacitor 20 is in an individual series circuit, or loop circuit, with capacitor 10 and switch 24, and upon operation of switch 24 the capacitor 20 is connected in shunt with capacitor 10. Means are provided to operate all of the switches 24, 25, 26, etc. substantially simultaneously, and several suitable capacitor switches adapted to be operated either mechanically, hydraulically, or by electrical control signals from a remote location are commercially available, one switch suitable for this invention being disclosed in U.S. Patent 2,671,141 to William J. Weinfurt entitled "Switch Operating Means" and having the same assignee as the present invention. In order to simplify the drawing and to facilitate the understanding of the invention, the details of the switches 24, 25, 26, etc. and the details of the means to operate them substantially simultaneously has been omitted. It will be understood, however, that, if the switches 24, 25, 26, etc. are electrically actuated, insulating transformer means 27, 28, 29, etc. may be required to raise the relatively low voltage actuating signals for switches 24, 25, 26, etc. to the potential level at which they are mounted. Further it will be appreciated that switches similar to 24, 25, 26, etc. in phases B and C of the three phase system will be substantially simultaneously actuated to connect all of the capacitors of step two in shunt between the three phase conductors of the polyphase power system and the neutral.

In step three of the capacitor bank switches 34, 35, 36, etc., similar to switches 24, 25, 26, etc. of step two, are connected to switch the capacitors 30, 31, 32, etc. of step three in parallel with individual capacitors, or series groups, 10, 11, 12, etc., respectively, of the first step (which are already in shunt with the capacitors 20, 21, 22, etc., respectively, of step two) at voltages which are only $1/n$ of the voltage between phase conductor 14 and neutral 15. For example, switch 34 is in an individual series circuit, or loop circuit, with the paralleled capacitors 30 and the paralleled capacitors 10 and 20 of steps one and two, and upon operation of switch 34 the capacitors 30 are connected in parallel with capacitors 10 and 20. Although the capacitor symbol 30 can represent any desired value of capacitance, two capacitors 30 have been illustrated in the drawing to signify that the reactive volt amperes of each succeeding step is preferably equal to that already connected to the power system. In other words, when the number $n$ of series groups is large, the kilovars of step three are preferably equal to the sum of the kilovars of steps one and two.

When the capacitors of the steps after the first are switched in parallel with capacitors of the first step, the electrical switches, e.g. 24, 25, 26, etc., for connecting the capacitors in parallel with the already energized capacitors may not operate exactly simultaneously, and an overvoltage may appear across the last capacitor, or series group, of step one to be connected in parallel with a capacitor of step two. The voltage across any one of a group of capacitors in series is directly proportional to its impedance and inversely proportional to its capacitance. When any one of the capacitors 20, 21, or 22 of step two is connected in shunt to a capacitor 10, 11, or 12 of step one, the resulting impedance of two such paralleled capacitors is less than the impedance of each of the remaining serially connected capacitors of step one, and the voltage on each said remaining serially connected capacitor is increased. The overvoltage is greatest on the capacitor 10, 11, or 12 of step one which is the last to be connected in parallel with a capacitor of step two. As shown on the curve of Fig. 2, wherein the overvoltage on the last capacitor to be shunted is plotted versus the ratio of kilovars of the added step to the sum of the kilovars of the already energized steps, the magnitude of this overvoltage increases with the number of capacitors in series, or series group, between conductors 14 and 15 and is also a function of the capacitance already switched onto the system. This overvoltage decreases with reduction in the ratio of $$\frac{\text{kilovar of added step}}{\text{kilovar of steps already energized}}$$

To insure maximum life of the capacitors, it is desirable that the overvoltage thereon never exceeds twice rated voltage even for the few cycles, or fractions of a cycle, between operations of the switches 24, 25, 26, etc. It will be apparent from the curve that if the above ratio does not exceed unity, that twice normal voltage will never appear across any capacitor regardless of the number of series groups. It will be apparent from the curve that if a large number of series groups are connected between line and neutral, it is desirable that this ratio does not exceed unity. However, for capacitor banks having two, three or four series groups between line and neutral, this ratio of $$\frac{\text{kilovar of added step}}{\text{kilovar of previously energized steps}}$$

may be from 1½ to 2 without resulting in an overvoltage on any capacitor exceeding twice normal voltage.

Assuming that the capacitor bank of Fig. 1 has nine series groups in each step between line and neutral, it is represented in the drawing that the kilovars of successive steps are so arranged that this ratio does not exceed unity by sowing the same number of capacitors 20, 21, 22, etc. in step two as in step one, by showing that the number of capacitors 30, 31, 32, etc. in step three is equal to the sum of the already energized capacitors 10—12, etc. and 20—22, etc. of steps one and two, and by representing that the number of capacitors 40, 41, 42, etc. in step four is equal to the sum of the capacitors 10—12, etc., 20—22, etc., and 30—32, etc. of steps one, two and three. Thus, if each capacitor symbol represents a series group of nine paralleled twenty-five kilovar capacitors, and assuming that nine series groups are connected between line 14 and neutral 15, a total of 9 times 9 times 25 equals 2025 kilovars of the first step are connected to the system, and if each of the nine series groups 20, 21, 22, etc. represents nine paralleled twenty-five kilovar capacitors or a total of 2025 kilovars in step two, the ratio of $$\frac{\text{kilovars of added step}}{\text{kilovars of steps already energized}}$$

is unity, and the curve of Fig. 2 shows that the overvoltage on the last series group 10, 11, 12, etc. to be switched in parallel with a series group 20, 21, 22, etc. respectively, is approximately 1.85 times normal voltage.

It will be apparent that in a capacitor bank in accordance with the invention no expensive oil circuit breaker is required, and further that the desired result of limiting overvoltage on the capacitors is accomplished as long as the kilovars of the added step does not exceed the preferred numerical ratio regardless of the actual number of capacitors in each series group.

In step four the switches 44, 45, 46, etc. are connected to switch capacitors 40, 41, 42, etc. in shunt with capacitors 10, 20, 30 and 11, 21, 31 and 12, 22, 32, etc., respectively, of the preceding steps. For example, switch 44 is in an individual series circuit, or loop circuit, with the paralleled capacitors 40 and the paralleled capacitors 10, 20, 30, and operation of switch 44 connects capacitors 40 in parallel with capacitors 10, 20, 30. As illustrated all switches are operated substantially simultaneously, the switches 44, 45, 46, etc. either being ganged mechanically or operated by electrical control signals raised to the potential level of the switches 44, 45, 46, etc. by isolating transformers 47, 48, 49, etc., and it will be appreciated that switches in phases B and C similar to switches 44, 45, 46, etc. will be operated substantially simultaneously to connect the capacitors of step four in the phases B and C of the bank between the respective phase conductors and the neutral 15.

It will be appreciated that the disclosed capacitor bank obviates the necessity of an expensive oil circuit breaker to vary the reactive kilovars supplied to an alternating current power system in steps. While a specific embodiment of the invention has been disclosed wherein the reactive kilovars of each succeeding step has a fixed proportion to the total kilovars of the previously switched steps, the disclosed arrangement is intended to assure that the overvoltages on the capacitors will not exceed a predetermined percentage of the operating voltage, and the invention obviates the necessity of an expensive oil circuit breaker and thus provides reduction in cost of the capacitor bank regardless of the reactive kilovars switched in each step. Further, the disclosed arrangement to limit the overvoltages on the capacitors is applicable to any capacitor bank which utilizes the voltage divider principle regardless of whether the first step of capacitors is permanently connected to the system or is switched by a circuit breaker.

While only a single embodiment of the invention has been illustrated and described, many modifications and variations thereof will be apparent to those skilled in the art, and it is intended in the appended claims to cover all such modifications and variations as fall within the true spirit and scope of the invention.

What I claim as new and desire to secure by Letters Patent of the United States is:

1. In an alternating current power line, a plurality of serially arranged first capacitors, said serial arrangement of capacitors being permanently connected in shunt to said line, a plurality of second capacitors, and a plurality of electrical switches each of which is connected to switch one of said second capacitors in shunt with one of said serially arranged first capacitors at a voltage which is only a fraction of the power line voltage, said second capacitors being disconnected from said power system when said switches are in open position.

2. In an alternating current power system including a pair of conductors, in combination, a plurality of serially arranged first capacitors, said serial arrangement of capacitors being connected directly to said conductors and in shunt to said system, a plurality of second capacitors, a plurality of electrical switches each of which is connected to switch one of said second capacitors in shunt with one of said serially arranged first capacitors at a voltage which is only a fraction of the power system voltage, said second capacitors being disconnected from said power system when said electrical switches are in open position, and means for operating said electrical switches substantially simultaneously.

3. In combination with an alternating current power system, a capacitor bank adapted to vary the reactive voltamperes supplied to said system in a plurality of steps, the first step comprising the serial arrangement of $n$ capacitors, said serial arrangement being permanently in shunt to said system, each succeeding step comprising a plurality of capacitors and a plurality of electrical switches each of which is connected to switch a capacitor of said step in parallel with a serially arranged capacitor of the first step at a voltage which is only a fraction of the power system voltage, the overvoltage on the last of the previously-energized capacitors to be paralleled incident to the operation of the switches of each successive step being a function of $n$ and of the ratio $$\frac{\text{kvar of said step}}{\text{total kvar of previously-energized steps}}$$

and the kilovar size of successive steps being arranged so that said ratio does not exceed unity when $n$ is 17 or greater, so that said ratio does not exceed 1.5 when $n$ is less than 17 but greater than 5, and so that said ratio does not exceed 2 when $n$ is greater than 2 but less than 6.

4. In combination with a polyphase alternating current power system, a capacitor bank adapted to vary the reactive volt-amperes supplied to said system in a plurality of steps, the first step including a plurality of serial arrangements of first capacitors, each said serial arrangement being permanently connected to one of the phase conductors of said power system and in shunt to said system, each succeeding step including a plurality of second capacitors, a plurality of electrical switches each of which is connected to switch at least one of said second capacitors in shunt with one of said serially arranged first capacitors at a voltage which is only a fraction of the power system voltage, and means to operate all of the electrical switches of said succeeding step substantially simultaneously.

5. In a polyphase alternating current power system having a neutral, a capacitor bank adapted to vary the reactive volt-amperes supplied to said system in a plurality of steps, the first step including a plurality of serial arrangements of first capacitors, each said serial arrangement being permanently connected between the neutral and one of the phase conductors of said polyphase power system, each succeeding step comprising a plurality of second capacitors, a plurality of electrical switches each of which is connected to switch at least one of said second capacitors in shunt with one of said serially arranged first capacitors at a voltage which is only a fraction of the power system voltage, and means for operating all of the electrical switches of said succeeding step substantially simultaneously, each said serial arrangement having no more than four capacitors in series and the reactive volt-amperes supplied to the system by successive steps being arranged so that the reactive volt-amperes supplied by any step is not greater than twice the total reactive volt-amperes supplied by all of the previously energized steps.

6. In combination with an alternating current power system, a capacitor bank adapted to vary the reactive volt-amperes supplied to said system in a plurality of steps, the first step comprising the serial arrangement of a plurality of capacitors, means for connecting said serial arrangement of capacitors in shunt to said system, each succeeding step comprising a plurality of capacitors, a plurality of electrical switches each of which is connected to switch a capacitor of said step in parallel with a serially arranged capacitor of the first step at a voltage which is only a fraction of the power system voltage, and means to operate all of the switches of said succeeding step substantially simultaneously, the total capacitance of the capacitors of each successive step being approximately equal to the total capacitance of the capacitors of all the previously energized steps.

7. In combination with an alternating current power system, a capacitor bank adapted to vary the reactive volt-amperes supplied to said system in a plurality of steps, the first step comprising the serial arrangement of a plurality of capacitors, means for connecting said serial arrangement of capacitors in shunt to said system, each succeeding step comprising a plurality of capacitors, a plurality of electrical switches each of which is connected to switch a capacitor of said step in parallel with a serially arranged capacitor of the first step at a voltage which is only a fraction of the power system voltage, and means to operate all of the switches of said succeeding step substantially simultaneously, the reactive volt-amperes supplied to the system by the successive steps of the bank being so proportioned that the overvoltage on any capacitor during the switching of the steps does not exceed twice normal voltage.

References Cited in the file of this patent

UNITED STATES PATENTS

| | | |
|---|---|---|
| 1,940,295 | Chutter | Dec. 19, 1933 |
| 2,205,866 | Schweitzer | June 25, 1940 |
| 2,295,388 | Cuttino | Sept. 8, 1942 |
| 2,340,827 | Thommen | Feb. 1, 1944 |
| 2,447,658 | Marbury | Aug. 24, 1948 |
| 2,722,656 | Marbury | Nov. 1, 1955 |
| 2,732,524 | Strozier | Jan. 24, 1956 |